(12) United States Patent
Asente

(10) Patent No.: US 8,674,995 B1
(45) Date of Patent: Mar. 18, 2014

(54) FOLDING AVOIDANCE IN SKELETAL STROKE APPLICATION

(75) Inventor: Paul J. Asente, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 957 days.

(21) Appl. No.: 12/459,376

(22) Filed: Jun. 29, 2009

Related U.S. Application Data

(60) Provisional application No. 61/212,720, filed on Apr. 14, 2009.

(51) Int. Cl.
*G06T 11/20* (2006.01)
*G06T 11/40* (2006.01)

(52) U.S. Cl.
CPC .......... *G06T 11/203* (2013.01); *G06T 11/206* (2013.01); *G06T 11/40* (2013.01)
USPC ........... 345/442; 345/418; 345/419; 345/420; 345/421; 345/422; 345/423; 345/424; 345/426; 345/427; 345/440; 345/440.1; 345/440.2; 345/441; 345/443; 345/473; 345/474; 345/581; 700/97; 700/165

(58) Field of Classification Search
CPC ...... G06T 11/203; G06T 11/206; G06T 11/40
USPC ........... 345/418–428, 471–474, 581; 700/97, 700/165
See application file for complete search history.

(56) References Cited

U.S. PATENT DOCUMENTS

| 5,539,868 A * | 7/1996 | Hosoya et al. ............... 345/471 |
| 6,035,242 A * | 3/2000 | Uemura et al. ................ 700/97 |
| 6,879,872 B2 * | 4/2005 | Fukumura ..................... 700/165 |
| 7,880,744 B2 * | 2/2011 | Bruderlin et al. ............ 345/581 |
| 2003/0052875 A1 * | 3/2003 | Salomie ........................ 345/419 |
| 2010/0045671 A1 * | 2/2010 | Slabaugh et al. ............ 345/420 |

OTHER PUBLICATIONS

Hsu et al., Drawing and Animation Using Skeletal Strokes, Siggraph '94, Jul. 24-29.
Hsu et al., Skeletal Strokes, UIST'93, Nov. 3-5, 1993.
Alan H. Barr, Global and Local Deformation of Solid Primitives, vol. 18, No. 3, Jul. 1984.

* cited by examiner

*Primary Examiner* — Jin-Cheng Wang
(74) *Attorney, Agent, or Firm* — Kilpatrick Townsend & Stockton LLP

(57) ABSTRACT

Folding avoidance in skeletal stroke application is provided. In some embodiments, folding avoidance in skeletal stroke application includes identifying a destination path for a source artwork and a plurality of ribs extending perpendicularly from the destination path, in which the source artwork is mapped onto the destination path; determining a contiguous region along the destination path including a subset of ribs; in which each of the subset of ribs in the contiguous region crosses another rib in the contiguous region that is not necessarily an adjacent rib; and adjusting each of the subset of ribs in the contiguous region so that each of the ribs no longer crosses another rib in the contiguous region to provide a modified subset of ribs. Accordingly, the source artwork can then be adapted to fit along the destination path using the adjusted ribs.

25 Claims, 23 Drawing Sheets

FOLDING AVOIDANCE IN SKELETAL STROKE APPLICATION

This application claims priority to U.S. Provisional Patent Application No. 61/212,720 entitled FOLDING AVOIDANCE IN SKELETAL STROKE APPLICATION filed Apr. 14, 2009, the contents which are incorporated herein by reference in their entirety.

BACKGROUND OF THE INVENTION

Skeletal strokes are a mechanism by which a piece of vector artwork designed with a straight spine is adapted to fit along a generalized curved path. Skeletal strokes forms the basis of various graphics applications (e.g., brush applications, such as Adobe® Illustrator® and Microsoft® Expressions Design®). Skeletal strokes is an aptly termed mechanism, because some of the intermediate constructions resemble a skeleton with a backbone and ribs.

BRIEF DESCRIPTION OF THE DRAWINGS

Various embodiments are disclosed in the following detailed description and the accompanying drawings.

DETAILED DESCRIPTION

Figure 1:
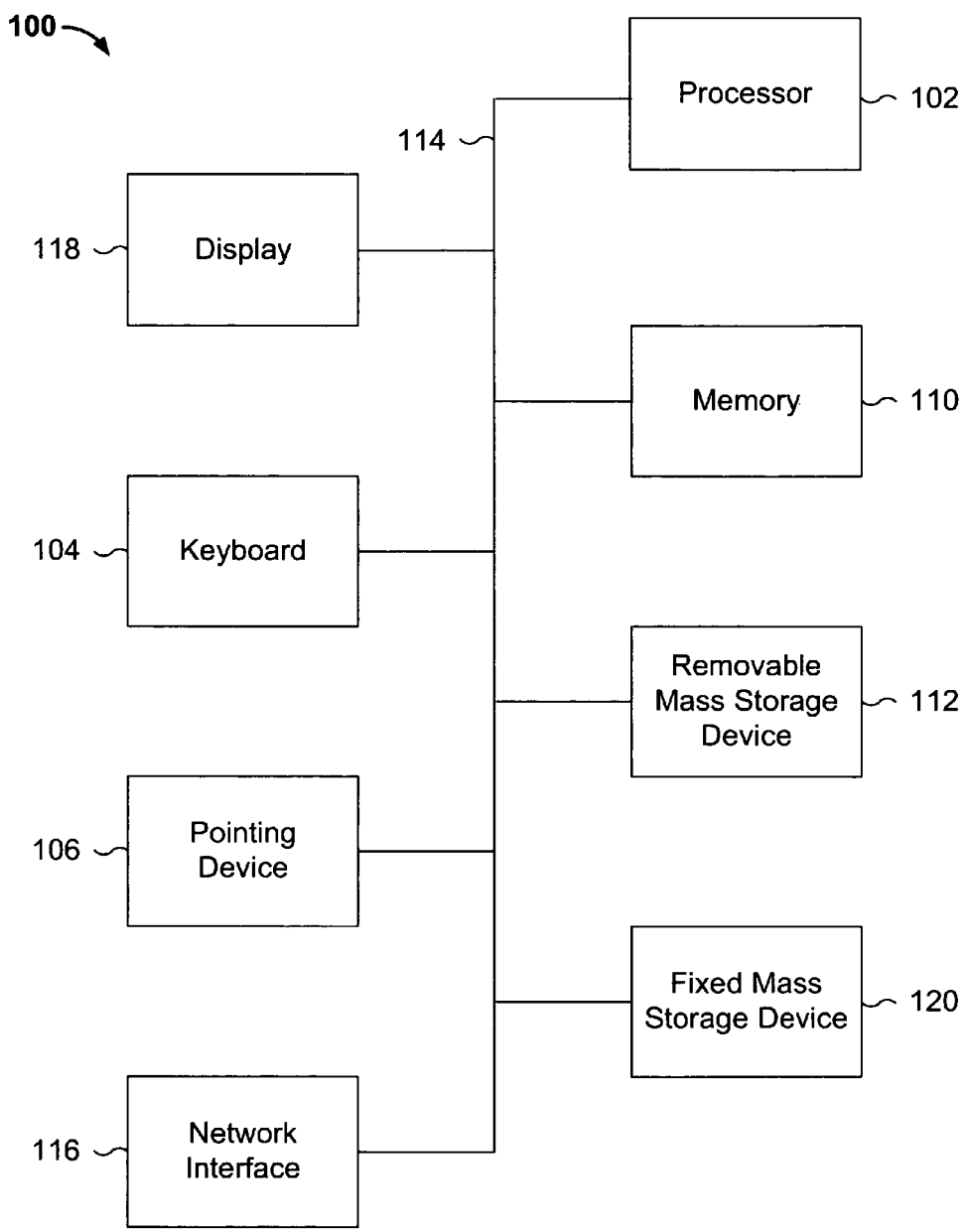
FIG. 1 is a functional diagram illustrating a programmed computer system for executing folding avoidance in skeletal stroke application in accordance with some embodiments.

Various embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the various approaches may take, may be referred to as techniques. In general, the order of the steps of disclosed processes may be altered within the scope of the techniques. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the techniques. The techniques are described in connection with such embodiments, but the techniques are not limited to any embodiment. The scope of the techniques is limited only by the claims, and the techniques encompass numerous alternatives, modifications, and equivalents. Numerous specific details are set forth in the following description in order to provide a thorough understanding of the techniques. These details are provided for the purpose of example and the techniques may be practiced according to the claims without some or all of these specific details. For the purpose of clarity, technical material that is known in the technical fields related to the techniques has not been described in detail so that the techniques are not unnecessarily obscured.

Skeletal strokes are a mechanism by which a piece of vector artwork designed with a straight spine is adapted to fit along a generalized curved path (e.g., an arbitrary curved path, also referred to herein as a destination path, which, for example, is a path that is based on a user input). Skeletal strokes are used for various types of graphics applications (e.g., brush applications, such as Adobe® Illustrator® and Microsoft® Expressions Design®).

However, when the destination path turns corners or includes areas with a small radius of curvature (e.g., relative to a width of a source artwork, such as when the radius of curvature of the destination path is smaller/less than a width of the source artwork, or the radius of curvature equals zero (e.g., a corner)), the mapped artwork takes on a folded or creased appearance inside this area of the curve, or corner (e.g., this problem is also referred to as creasing or folding as the mapped artwork in this area appears to be creasing or the artwork appears to be folding onto itself), which is generally an undesirable/unsatisfactory result for the mapped artwork.

Accordingly, folding avoidance in skeletal stroke application is provided that eliminates these folds or creases by adjusting the skeleton before using it to map/fit the source artwork to the destination path. In some embodiments, a centerline, such as a straight spine, or some other path/edge of the source artwork (e.g., a vector artwork, for which any artistic treatment can be applied to a path, such as the straight spine (also referred to as strokes, such as structured strokes, artwork strokes, or skeletal strokes)) is identified for applying the techniques disclosed herein. In some embodiments, folding avoidance in skeletal stroke application includes identifying a destination path for a source artwork and a plurality of ribs extending perpendicularly from the destination path, in which the source artwork is mapped onto the destination path; determining a contiguous region along the destination path including a subset of ribs; in which each of the subset of ribs in the contiguous region crosses another rib in the contiguous region that is not necessarily an adjacent rib; and adjusting each of the subset of ribs in the contiguous region so that each of the ribs no longer crosses another rib in the contiguous region to provide a modified subset of ribs. In some embodiments, the destination path includes one or more segments, each of which can be curved or straight. Accordingly, the source artwork can then be adapted to fit along the destination path using the adjusted ribs.

FIG. 1 is a functional diagram illustrating a programmed computer system for executing folding avoidance in skeletal stroke application in accordance with some embodiments. As shown, FIG. 1 provides a functional diagram of a general purpose computer system programmed to perform folding avoidance in skeletal stroke application in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 performs/executes the functionality described below with respect FIGS. 2 through 20 and/or performs/executes the processes described below with respect to FIGS. 21 through 23

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown), can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
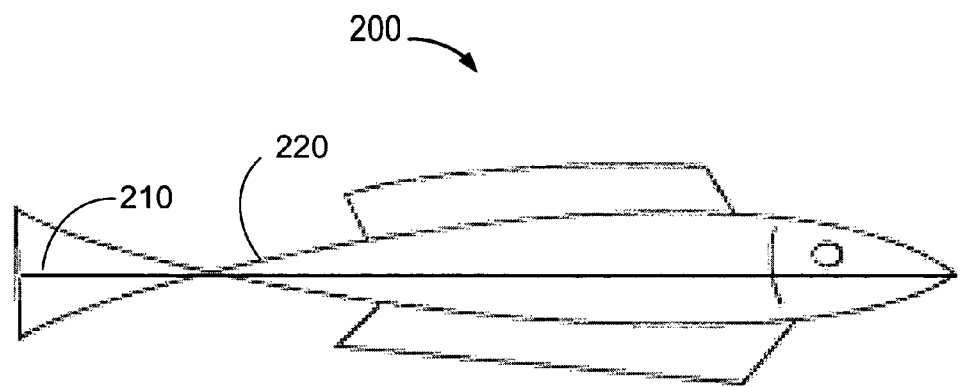
FIG. 2 illustrates a stroke artwork including a straight spine in accordance with some embodiments.

FIG. 2 illustrates a stroke artwork including a straight spine in accordance with some embodiments. As shown, FIG. 2 illustrates a stroke artwork 200 (e.g., a source artwork) including a straight spine 210 and a path 220. As will be appreciated, stroke artwork 200 includes several different paths, including the path 220, which define the stroke artwork 200.

Figure 3:
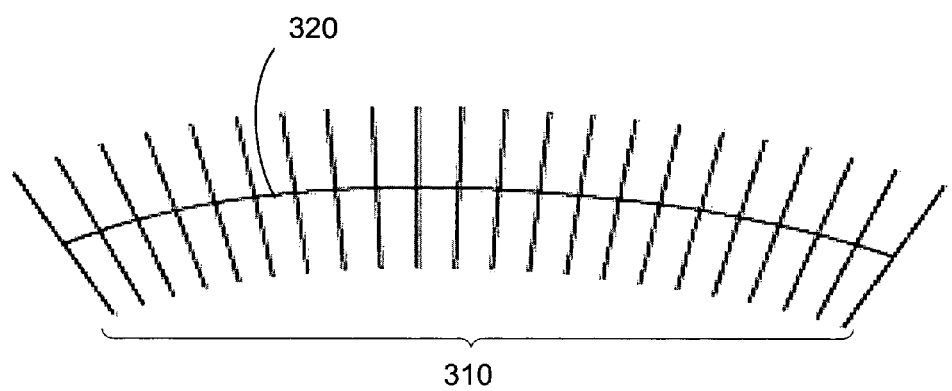
FIG. 3 illustrates a destination path intersected with a set of ribs in accordance with some embodiments.

FIG. 3 illustrates a destination path 320 intersected with a set of ribs 310 in accordance with some embodiments. As shown, each of the ribs of the set of ribs 310 intersect the destination path 320 perpendicularly. In some embodiments, a width of each of the ribs of the set of ribs 310 is equal to a width (e.g., maximum width) of the stroke artwork 200. In some embodiments, each of the ribs of the set of ribs 310 is equidistant from adjacent ribs. In some embodiments, each of the ribs of the set of ribs 310 is closer to adjacent ribs in areas in which the radius of curvature is smaller (e.g., where the destination path 320 curves more). In some embodiments, the set of ribs 310 include a greater number of ribs than shown in FIG. 3 and are much closer together than shown in FIG. 3.

Figure 4:
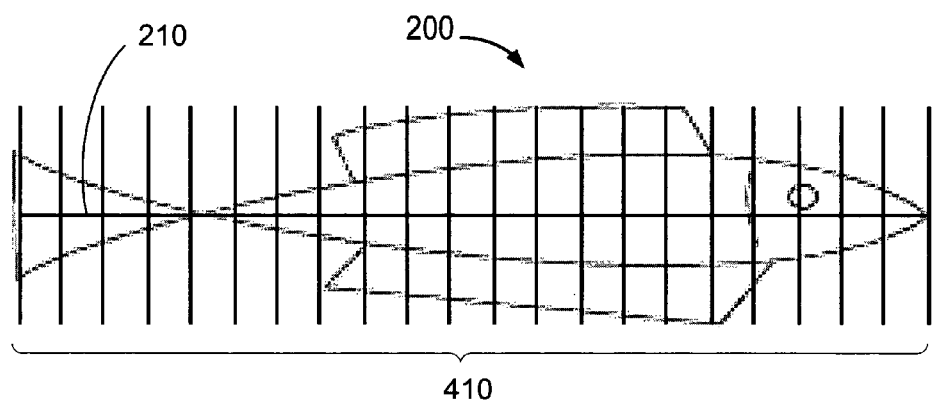
FIG. 4 illustrates the stroke artwork of FIG. 2 including the straight spine intersected with a set of ribs in accordance with some embodiments.

FIG. 4 illustrates the stroke artwork 200 of FIG. 2 including the straight spine 210 intersected with a set of ribs 410 in accordance with some embodiments. As shown, each of the ribs of the set of ribs 410 intersect the straight spine 210 perpendicularly. Also as shown, a width of each of the ribs of the set of ribs 410 is equal to a width of the stroke artwork 200. In some embodiments, the set of ribs 410 is distributed along the straight spine 210 in the same manner that the set of ribs 310 is distributed along the destination path 220 as shown in and discussed with respect to FIG. 3. In some embodiments, each of the ribs of the set of ribs 410 is equidistant from adjacent ribs. In some embodiments, each of the ribs of the set of ribs 410 is closer to adjacent ribs in areas in which the radius of curvature of a path of the stroke artwork 200 is smaller (e.g., where a path of the stroke artwork 200 curves more). In some embodiments, the set of ribs 410 include a greater number of ribs than shown in FIG. 4 and are much closer together than shown in FIG. 4.

Figure 5:
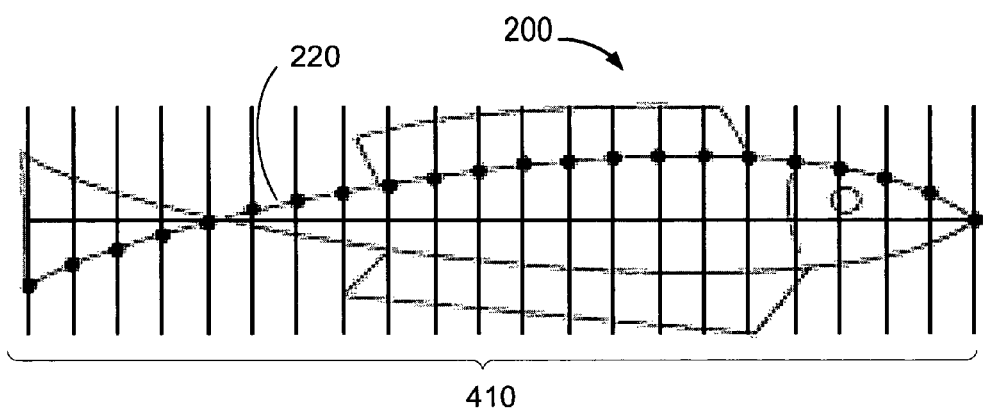
FIG. 5 illustrates the stroke artwork of FIG. 2 including the path intersected with the set of ribs in accordance with some embodiments.

FIG. 5 illustrates the stroke artwork 200 of FIG. 2 including the path 220 intersected with the set of ribs 410 in accordance with some embodiments. As shown, where the path 220 crosses/intersects each rib of the set of ribs 410 is determined. In some embodiments, this process is repeated for each path of the stroke artwork 200 of FIG. 2.

Figure 6:
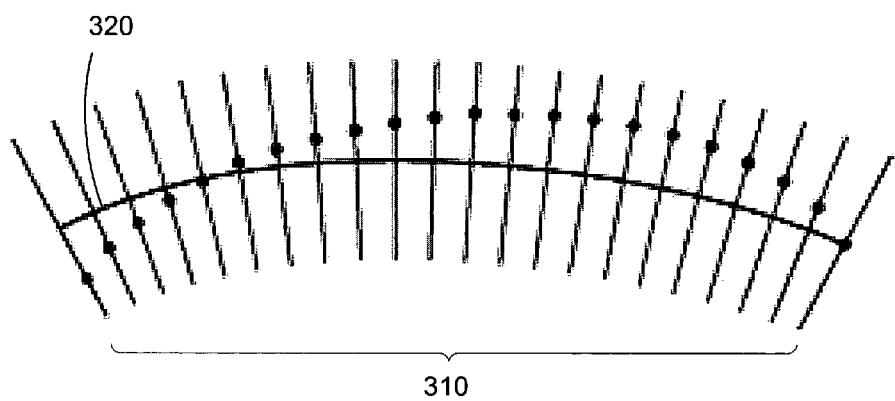
FIG. 6 illustrates the destination path of FIG. 3 intersected with the set of ribs including a mapping of the path in accordance with some embodiments.

FIG. 6 illustrates the destination path 320 of FIG. 3 intersected with the set of ribs 310 including a mapping of the path 220 in accordance with some embodiments. As shown, where the path 220 crossed each rib of the set of ribs 410 as shown in FIG. 5 is used to map the path 220 to the set of ribs 310. For example, a distance from each intersection of the path 220 with each rib of the set of ribs 410 to the spine 210 is determined as shown in FIG. 5, and those respective distances for each corresponding rib are mapped using such distances relative to the destination path 320 as shown in FIG. 6. For example, the intersection points in FIG. 6 are proportionally (relative to the width of the ribs) the same distance from the spine as in FIG. 5. In some embodiments, this process is repeated for each path of the stroke artwork 200 of FIG. 2.

Figure 7:
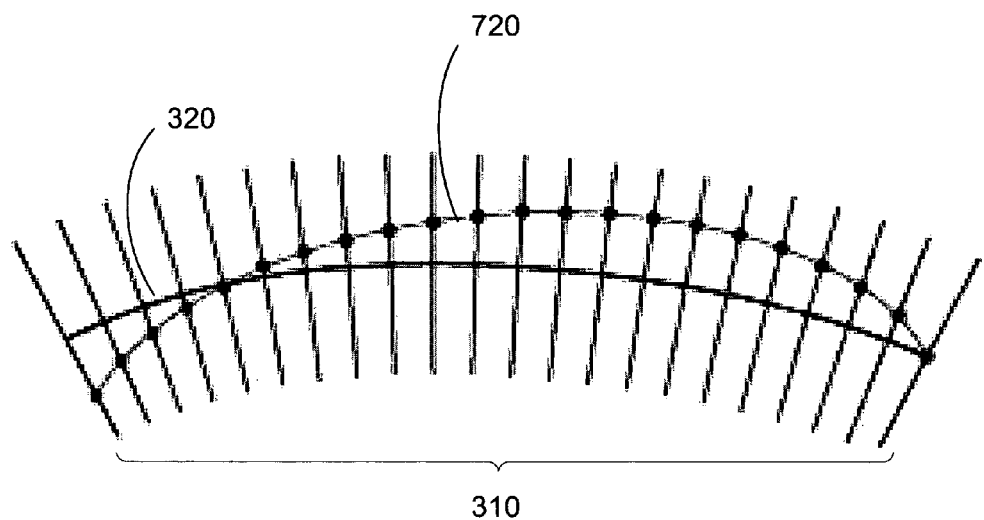
FIG. 7 illustrates a mapped path in accordance with some embodiments.

FIG. 7 illustrates a mapped path 720 in accordance with some embodiments. As shown, the mapped path 720 is fitted based on the mapped/fitted path as shown in FIG. 6 (e.g., using any curve fitting technique, such as determining a distance from the spine 210 in FIG. 5 for each crossing/intersection of the path 210 with each rib of the set of ribs 410 and using that distance to fit the path 220 to the ribs 310 relative to the destination path 320). In some embodiments, this process is repeated for each path of the stroke artwork 200 of FIG. 2, which provides the resulting mapped stroke artwork shown in FIG. 8 (shown with the ribs 310) and FIG. 9 (shown without the ribs 310).

Figure 8:
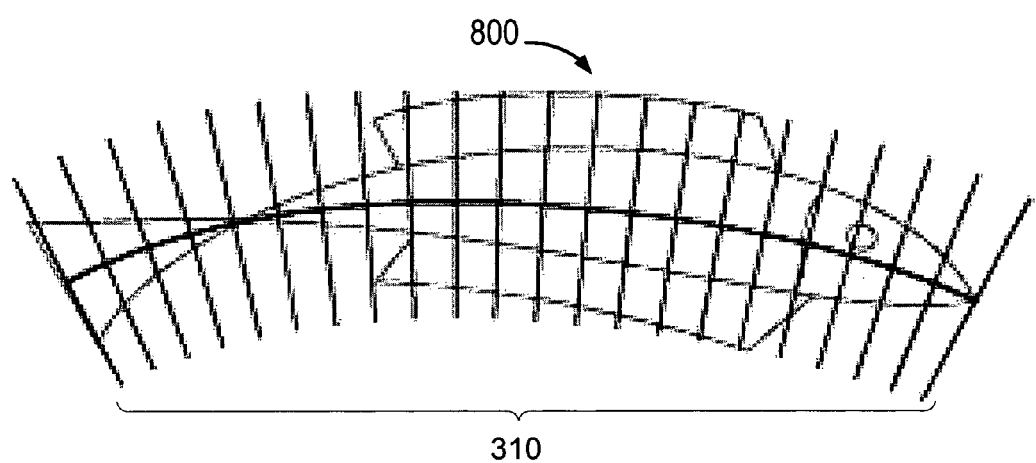
FIG. 8 illustrates the stroke artwork of FIG. 2 fit to the destination path of FIG. 3 shown with the set of ribs in accordance with some embodiments.

FIG. 8 illustrates the stroke artwork 200 of FIG. 2 fit to the destination path 320 of FIG. 3 shown with the set of ribs 310 in accordance with some embodiments. As shown, a mapped stroke artwork 800 is provided, and is shown with the set of ribs 310.

Figure 9:
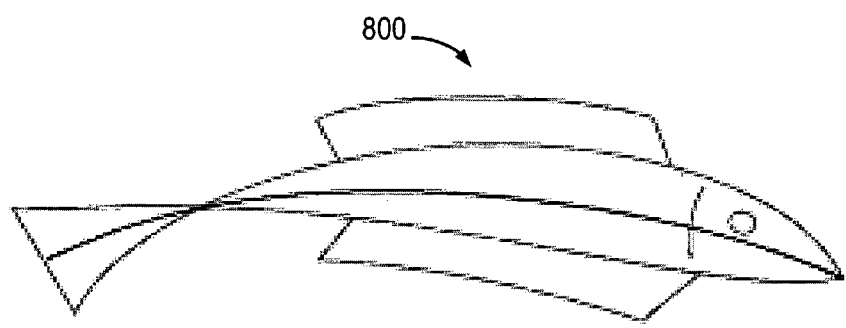
FIG. 9 illustrates the stroke artwork of FIG. 2 fit to the destination path of FIG. 3 in accordance with some embodiments.

FIG. 9 illustrates the stroke artwork 200 of FIG. 2 fit to the destination path 320 of FIG. 3 in accordance with some embodiments. As shown, the mapped stroke artwork 800 of FIG. 8 is provided, and is shown without the set of ribs 310.

Figures 10A, 10B:
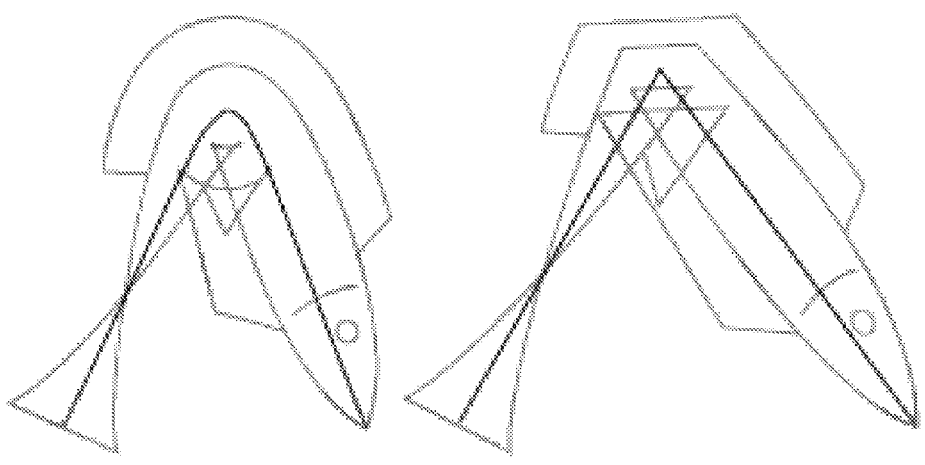
FIGS. 10(a) and 10(b) illustrate mapped stroke artwork in which folding or creasing problems arise.

FIGS. 10(a) and 10(b) illustrate mapped stroke artwork in which folding or creasing problems arise. As shown, problems arise when the destination path has a sharp turn or a corner. In particular, merely applying the techniques described above with respect to FIGS. 2 through 9 provides the results shown in FIGS. 10(a) and 10(b), which are generally not the user expected or desired results for a mapping/fitting of a source artwork to a destination path. For example, on the inside of the turn or corner of each of these mapped stroke artworks, the stroke artwork folds over upon itself. For example, referring to FIG. 10(b), which depicts a stroke artwork with a corner, the stroke artwork cuts off the outside of the corner as shown.

Generally, these folding/creasing problems arise wherever the radius of curvature of the destination path is smaller than the width of the stroke artwork (e.g., a maximum width of the stroke artwork). A corner is a special case of this problem, because the radius of curvature at a corner is 0. As discussed further below, this folding/creasing problem generally occurs in such problem areas, because these situations result in certain ribs of the set of ribs constructed for the destination path to cross/intersect each other in the problem areas, as shown in FIG. 12. Accordingly, in some embodiments, as described in detail below, identifying these problem areas and then adjusting the ribs in these problem areas so the skeletons look like, for example, FIGS. 13(a) and 13(b), achieves the desired results, for example, shown in FIGS. 11(a) and 11(b), respectively.

Figure 11A:
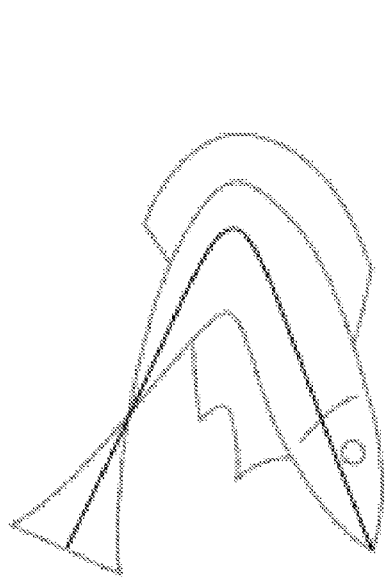
FIGS. 11(a) and 11(b) illustrate mapped stroke artwork using folding avoidance in skeletal stroke application in accordance with some embodiments.
Figure 11B:
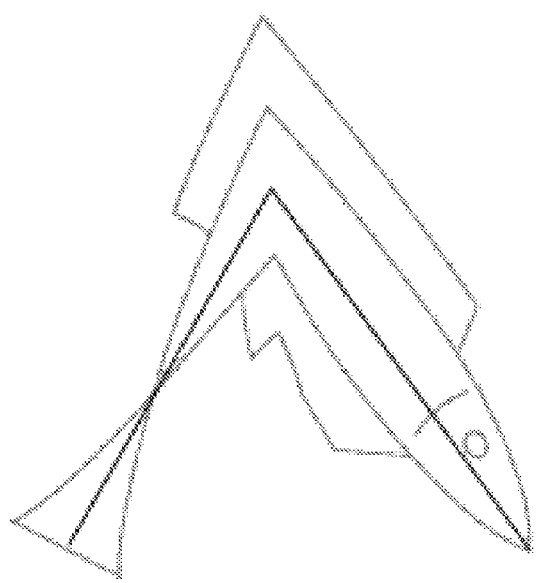

FIGS. 11(a) and 11(b) illustrate mapped stroke artwork using folding avoidance in skeletal stroke application in accordance with some embodiments. In contrast to FIGS. 10(a) and 10(b), applying the folding avoidance in skeletal stroke application as described below, provides results that are generally what users would expect for a mapping/fitting of a source artwork to a destination path.

Figures 12A, 12B:
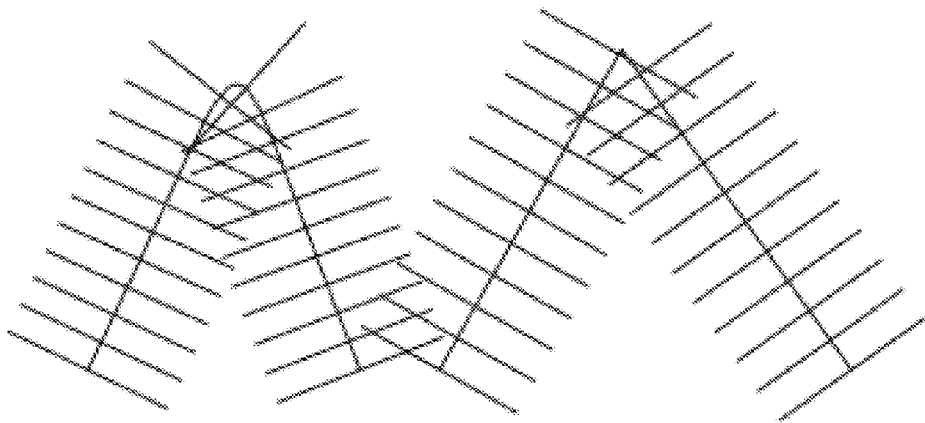
FIGS. 12(a) and 12(b) illustrate a destination path intersected with a set of ribs.

FIGS. 12(a) and 12(b) illustrate a destination path intersected with a set of ribs. As shown, certain ribs intersect other ribs in problem areas (e.g., the sharp curve of FIG. 12(a) and the corner of FIG. 12(b)).

Figures 13A, 13B:
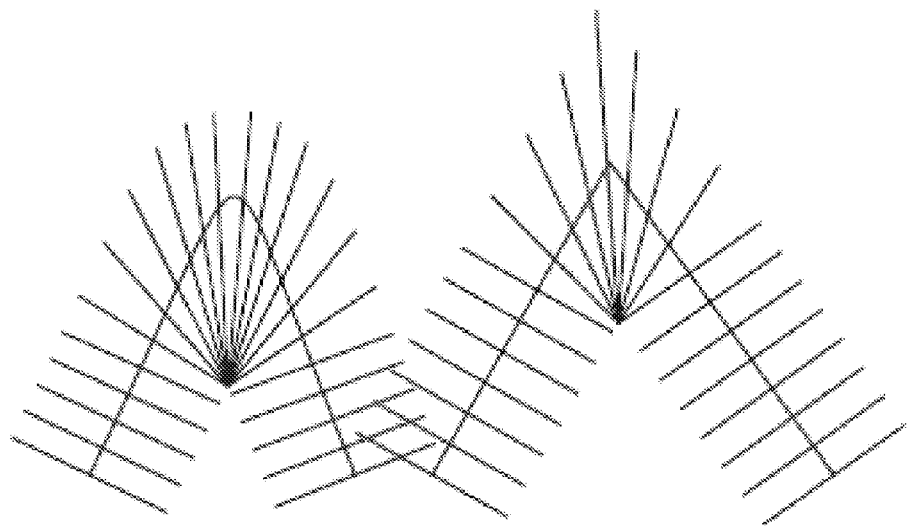
FIGS. 13(a) and 13(b) illustrate a destination path intersected with a modified subset of ribs in accordance with some embodiments.

FIGS. 13(a) and 13(b) illustrate a destination path intersected with a modified subset of ribs in accordance with some embodiments. As shown and as described further below, a subset of ribs (e.g., in the problem area, as described further below) are adjusted/modified so that they no longer intersect any other rib. In some embodiments, a subset of ribs are adjusted/modified to provide a subset of ribs that no longer intersect any other rib by relaxing the following requirements: (1) ribs need not be perpendicular to the destination path (e.g., the spine); and (2) ribs need not be of equal length (e.g., equal to a maximum width of a source artwork). Referring to FIG. 13(a), the modified subset of ribs are adjusted so that they no longer are required to intersect perpendicularly with the destination path, and the interior (below the path) length of the ribs are no longer equal in length relative to the unmodified ribs. Referring to FIG. 13(b), the modified subset of ribs are adjusted so that they no longer are required to intersect perpendicularly with the destination path, and both the exterior (above the path) and the interior (below the path) length of the ribs are no longer equal in length relative to the unmodified ribs. Accordingly, a subset of the ribs are adjusted to provide the modified ribs as shown in FIGS. 13(a) and 13(b). As will be appreciated, various approaches are described herein for adjusting a subset of the ribs to provide a modified subset of ribs so that they no longer intersect with any other rib.

Figures 14A, 14B:
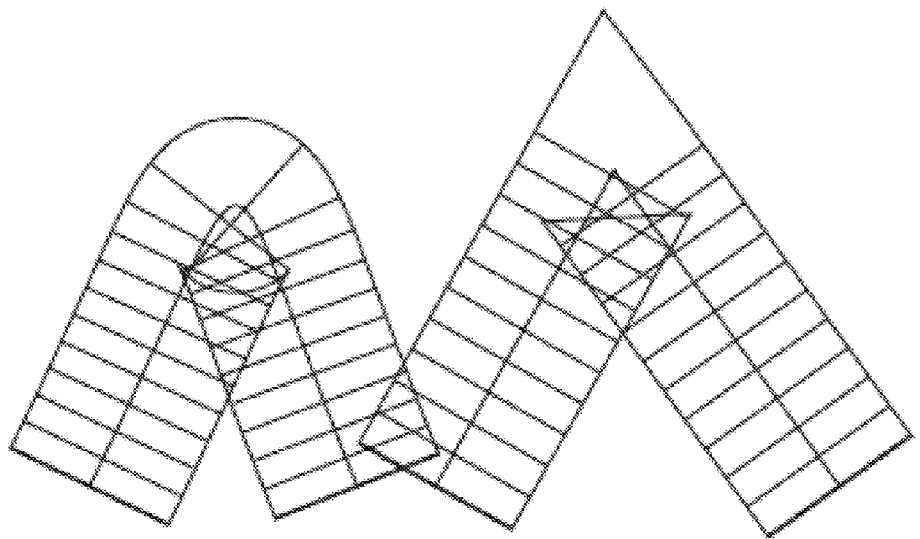
FIGS. 14(a) and 14(b) illustrate a destination path intersected with a set of ribs and a stroke envelope in accordance with some embodiments.

FIGS. 14(a) and 14(b) illustrate a destination path intersected with a set of ribs and a stroke envelope in accordance with some embodiments. As similarly shown in FIGS. 12(a) and 12(b), respectively, certain ribs intersect other ribs in the problem areas (e.g., the sharp curve of FIG. 12(a) and the corner of FIG. 12(b)). As shown in FIGS. 14(a) and 14(b), the stroke envelope is provided as the outer paths connecting the set of ribs. For example, the stroke envelope can be constructed by using a simple rectangle as the stroke artwork. As another example, the stroke envelope can be constructed by smoothly connecting the outsides ends of the ribs as applied to the path. In the case of a corner, the stroke envelope can be constructed as described above with the additional requirement that the stroke envelope does not have the corner cut off, which is what would result if the outsides of the ribs are connected directly; instead, the edges of the envelope are extended in a straight line on the outside of the corner, and the stroke envelope follows these extended edges to their intersection, as shown in FIG. 14(b).

Figures 15A, 15B:
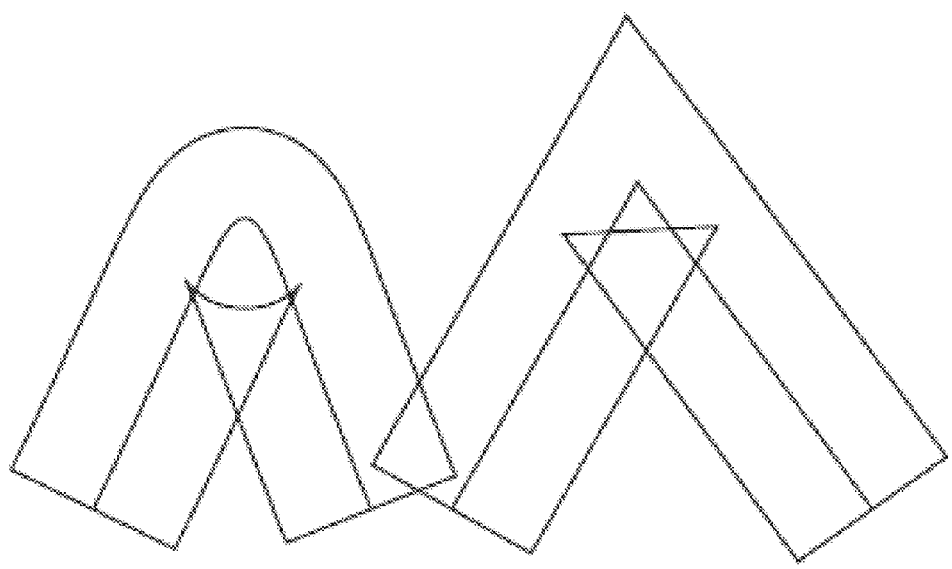
FIGS. 15(a) and 15(b) illustrate a destination path with a stroke envelope.

FIGS. 15(a) and 15(b) illustrate a destination path with a stroke envelope. As shown, FIGS. 15(a) and 15(b) illustrate the stroke envelopes of FIGS. 14(a) and 14(b), respectively, but without the set of ribs depicted. Also as shown, each envelope has an area where the interior stroke envelope edge "goes backwards" on the inside of the turn or corner, which corresponds to a unique characteristic associated with these problem areas (e.g., the sharp turn depicted in FIG. 15(a) and the corner depicted in FIG. 15(b)) that give rise to creasing or folding, as further discussed below.

Figure 16:
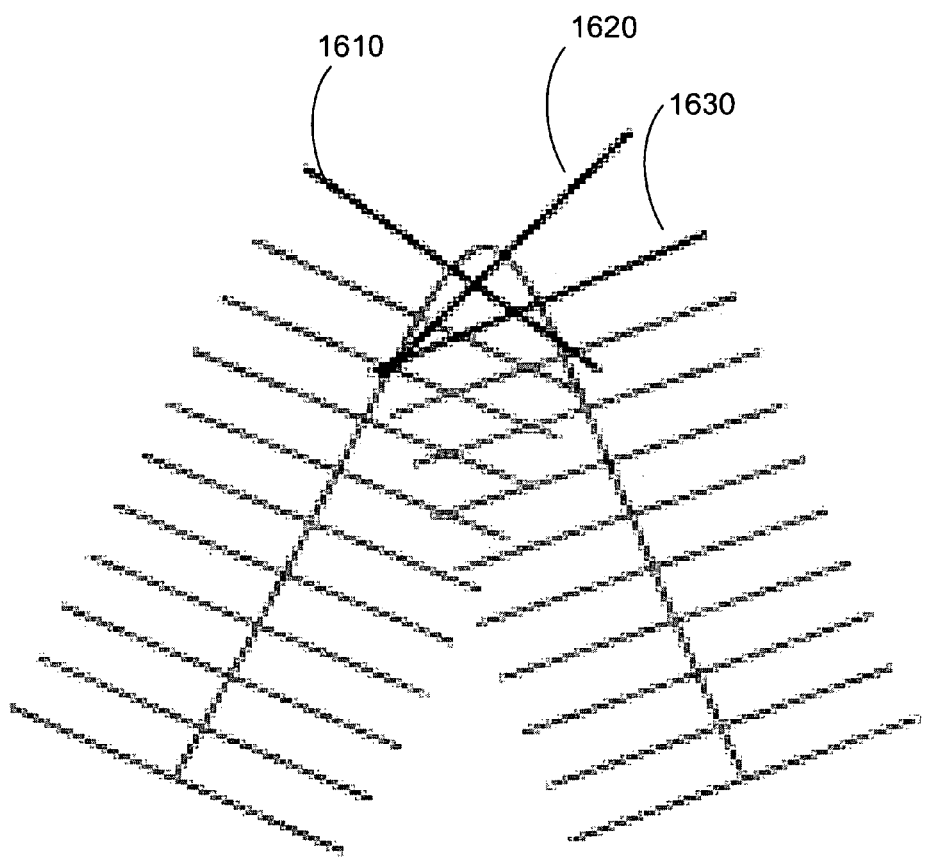
FIG. 16 illustrates an identification of adjacent ribs crossing each other in accordance with some embodiments.

FIG. 16 illustrates an identification of adjacent ribs crossing each other in accordance with some embodiments. To provide folding avoidance in skeletal stroke application, the problem areas (e.g., sharp turns or curves of the destination path) are determined. Referring to FIG. 16, the problem areas are determined in part by determining an area of the destination path where adjacent ribs cross or intersect each other. As shown, the adjacent crossing ribs are ribs 1610, 1620 and 1630. For example, as will be appreciated, identifying adjacent crossing ribs can be determined using any appropriate curve/path intersection technique.

In some embodiments, the radius of curvature is used to determine these problem areas. For example, as will be appreciated, the radius of curvature of the path at any point can be computed using standard geometric techniques. In some embodiments, the radius of curvature is determined wherever a rib extends from the destination path, and at each corner. If the radius is less than a width of the stroke artwork (including the case where it is equal to zero, at a corner), then a problem area that requires adjustment is identified, and this area is extended outwards in both directions through all ribs that cross/intersect other ribs that are not necessarily adjacent ribs. In some embodiments, the radius of curvature is computed and stored as part of a process of constructing the set of ribs for the destination path.

Figure 17:
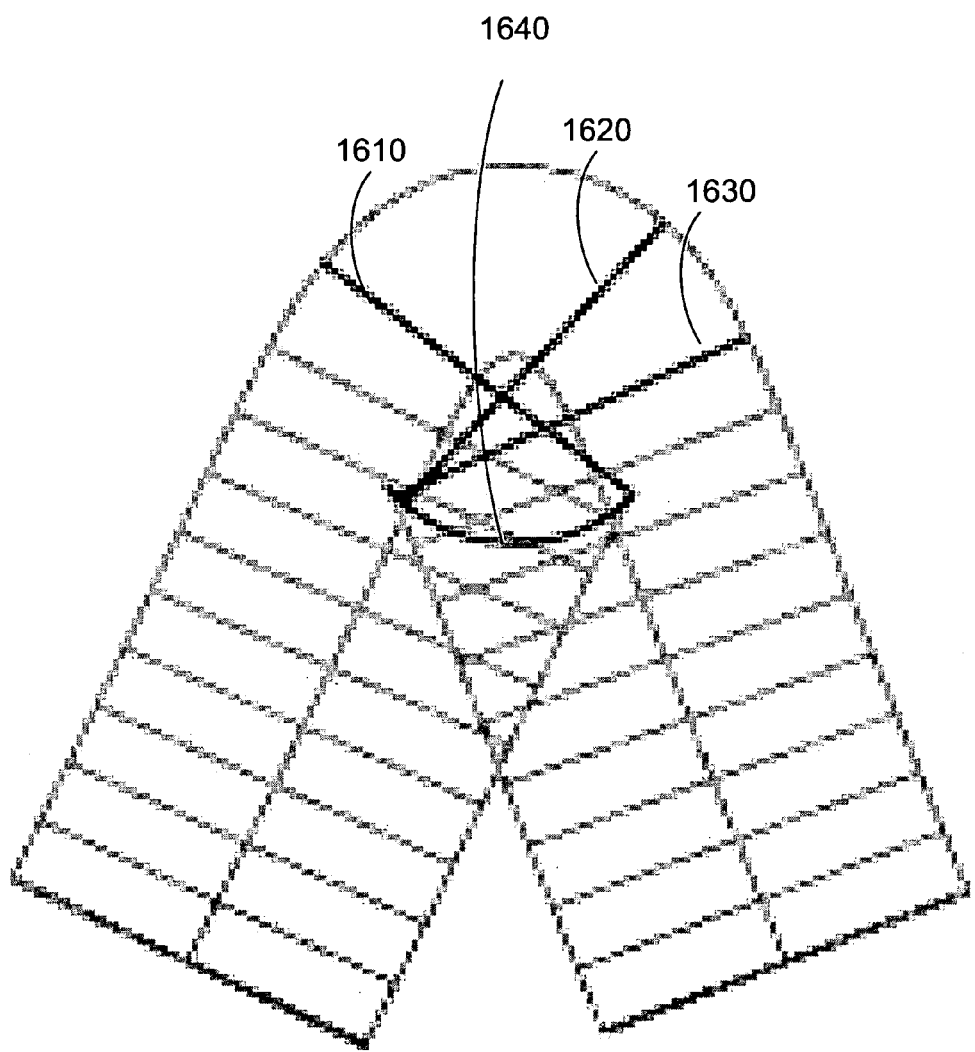
FIG. 17 illustrates an identification of adjacent ribs crossing each other and a retrograde path in accordance with some embodiments.

FIG. 17 illustrates an identification of adjacent ribs crossing each other and a retrograde path 1640 in accordance with some embodiments. As shown, FIG. 17 includes the intersecting ribs 1610, 1620, and 1630 as similarly shown in FIG. 16, along with the stroke envelope as similarly discussed above. In addition, as shown in FIG. 17, the retrograde path 1640 is shown that represents/defines the retrograde area, which is the area where the ribs cross the next adjacent rib and where the interior stroke envelope edge "goes backwards" when drawing the stroke envelope between the interior rib endpoints of the adjacent crossing ribs 1610, 1620, and 1630 (e.g., FIG. 17 shows that the adjacent crossing ribs 1610, 1620, and 1630 correspond to the portion of the stroke envelope that "goes backwards" inside the fold, on the inside of the turn).

Figure 18:
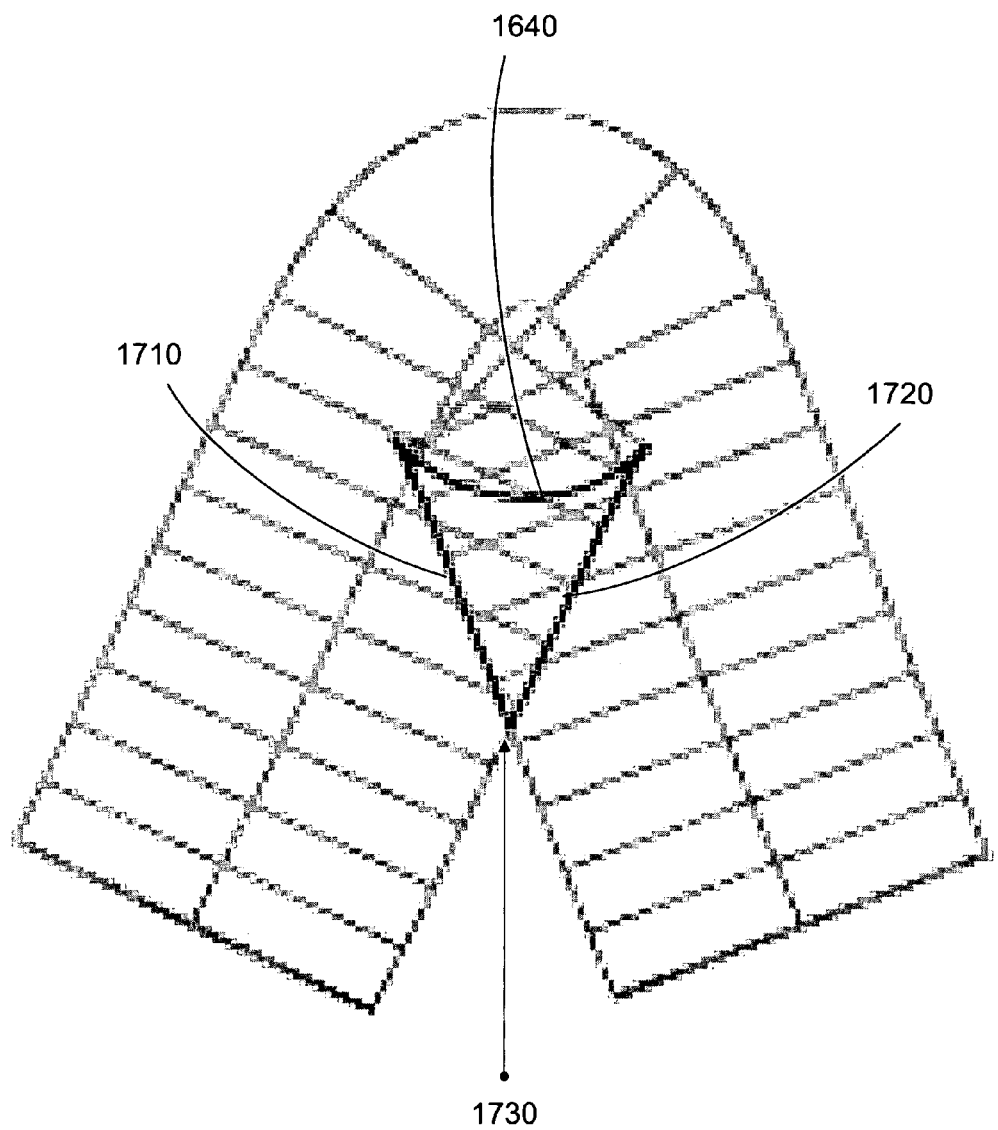
FIG. 18 illustrates an identification of a contiguous region along the destination path including a subset of ribs, in which each of the subset of ribs in the contiguous region crosses another rib in the contiguous region that is not necessarily an adjacent rib in accordance with some embodiments.

FIG. 18 illustrates an identification of a contiguous region along the destination path including a subset of ribs, in which each of the subset of ribs in the contiguous region crosses another rib in the contiguous region that is not necessarily an adjacent rib in accordance with some embodiments. As shown, paths 1710 and 1720 are determined based on where the interior stroke envelope edge intersects itself at the interior stroke envelope edge intersection point 1730 (e.g., using a standard curve/path intersection technique to identify the interior stroke envelope edge intersection point 1730), connecting the interior stroke envelope edge intersection point 1730 to respective ends of the retrograde path 1640 to provide paths 1710 and 1720, respectively (e.g., as shown in FIG. 17, having identified the backwards portion of the stroke envelope, the edge of the stroke envelope is traced out to where each of the ribs intersect, as shown in FIG. 18). As a result, the contiguous area is defined by the region defined by the retrograde path 1640 and the paths 1710 and 1720. Accordingly, the problem area is the area (e.g., triangle) defined by the adjacent ribs crossing (e.g., retrograde area) and the stroke envelope crossing point as shown in FIG. 18. Any rib that ends in this contiguous region along the destination path is included in the subset of ribs to be adjusted (e.g., a minimum subset of ribs requiring adjustment to provide folding avoidance in skeletal stroke application), which can be adjusted as described below to provide folding avoidance in skeletal stroke application.

Figure 19:
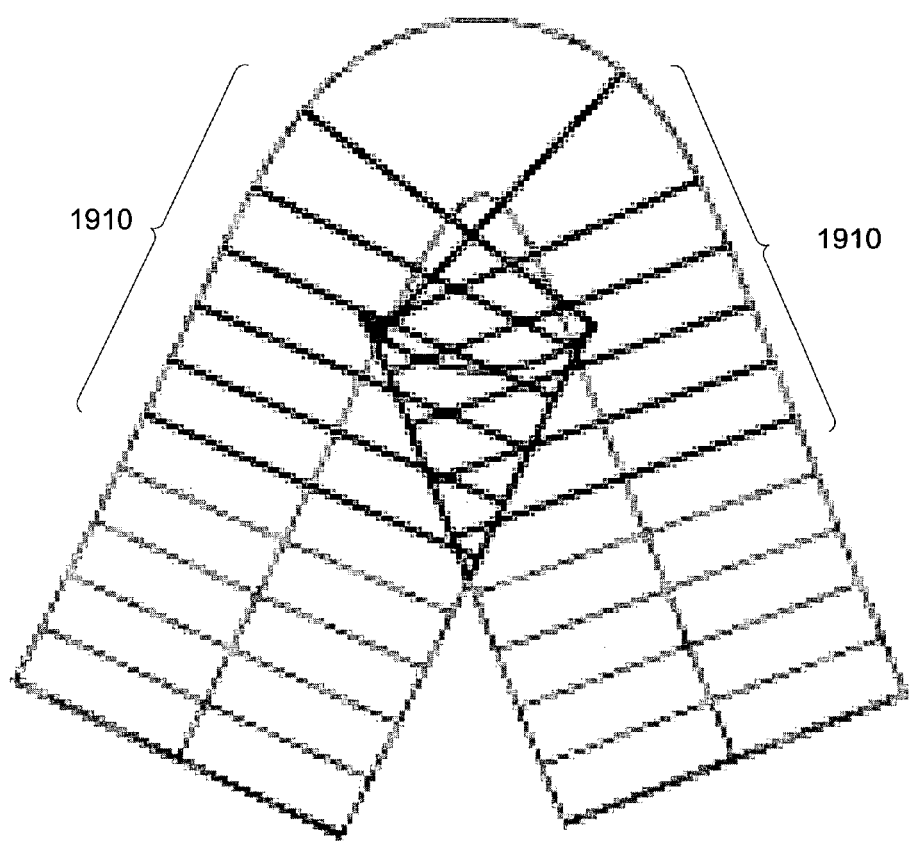
FIG. 19 illustrates the contiguous region of FIG. 18 along the destination path including a subset of ribs in accordance with some embodiments.

FIG. 19 illustrates the contiguous region of FIG. 18 along the destination path including a subset of ribs 1910 in accordance with some embodiments. As shown, each of the ribs in the subset of ribs 1910 in the contiguous region of FIG. 18 requires adjustment to provide folding avoidance in skeletal stroke application.

Figure 20:
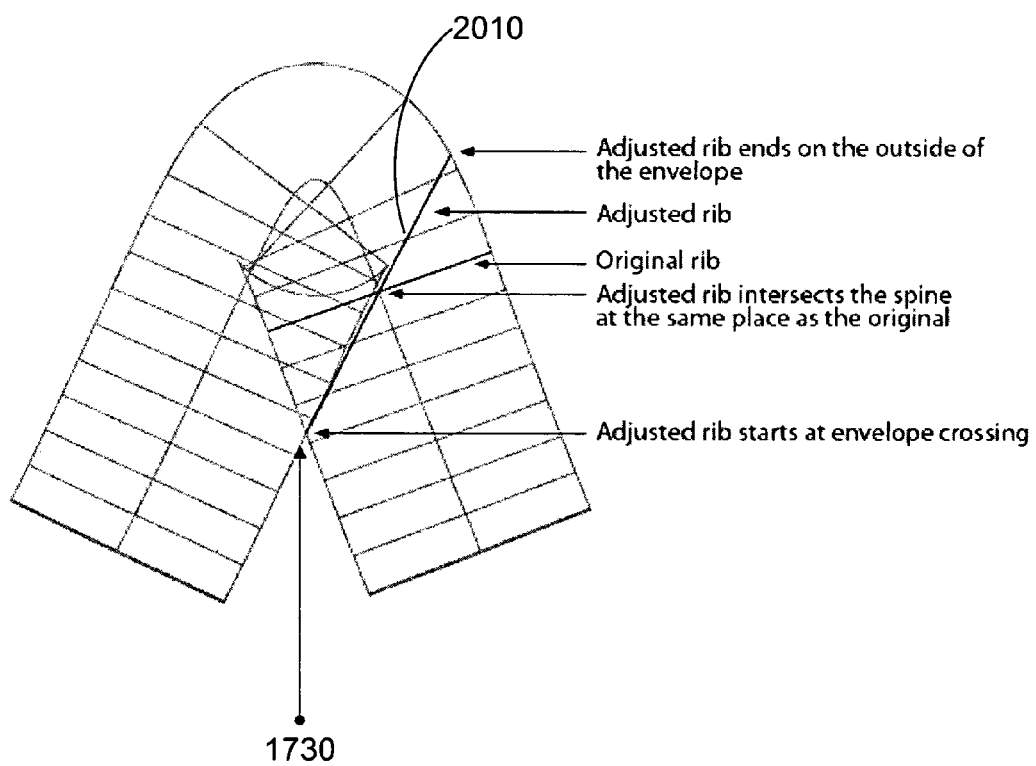
FIG. 20 illustrates an adjustment of each of the ribs in the subset of ribs in the contiguous region along the destination path in accordance with some embodiments.

FIG. 20 illustrates an adjustment of each of the ribs in the subset of ribs in the contiguous region along the destination path in accordance with some embodiments. As shown, the end of a rib 2010 on the inside of the turn or corner (interior) is moved to the point where the envelope edges intersect at the interior stroke envelope edge intersection point 1730. The rib 2010 then continues in a straight line through the point where the unadjusted rib intersects the destination path, and ends where the extended rib intersects the outer stroke envelope edge on the outside of the turn or corner. In particular, FIG. 20 shows the rib 2010 before and after adjustment. Performing this adjustment for each rib in the contiguous region along the destination path, results in the skeletons shown in, for example, FIGS. 13(*a*) and 13(*b*). In some embodiments, the interior of the ribs in the contiguous region along the destination path are adjusted to be shorter (e.g., to avoid a folding/creasing problem and ensure that the ribs do not intersect). In some embodiments, the exterior of the ribs in the contiguous region along the destination path are adjusted to be longer (e.g., for a corner problem area). In some embodiments, the ribs in the contiguous region along the destination path are adjusted so that the ribs no longer intersect the destination path perpendicularly. In some embodiments, the ribs in the contiguous region along the destination path are adjusted so that the ribs no longer are evenly spaced apart from each other. In some embodiments, the ribs in the contiguous region along the destination path are adjusted so that the ribs no longer are required to be straight and are, for example, allowed to bend (e.g., ribs can be provided that end on the outer edge of the stroke envelope as before any adjustment but are adjusted after crossing the destination path so as to end at the interior stroke envelope edge crossing point to avoid any crossing of ribs). As will be appreciated, various other adjustments can be provided to avoid crossing of ribs in the problem area(s) (e.g., the subset of ribs located in the contiguous region along the destination path).

In some embodiments, a destination path includes a compound bend like an S-curve that requires adjustment on both sides of the compound bend. In this example, there is a subset of ribs that lies within both problem areas that require adjusting and can be adjusted using either side's center of crossing. For example, a segment connecting the two centers of crossing can be constructed to determine where it crosses the destination path. Using this approach, each of the subset of ribs is adjusted according to which side of this crossing each of the ribs of the subset of ribs occurs on.

Figure 21:
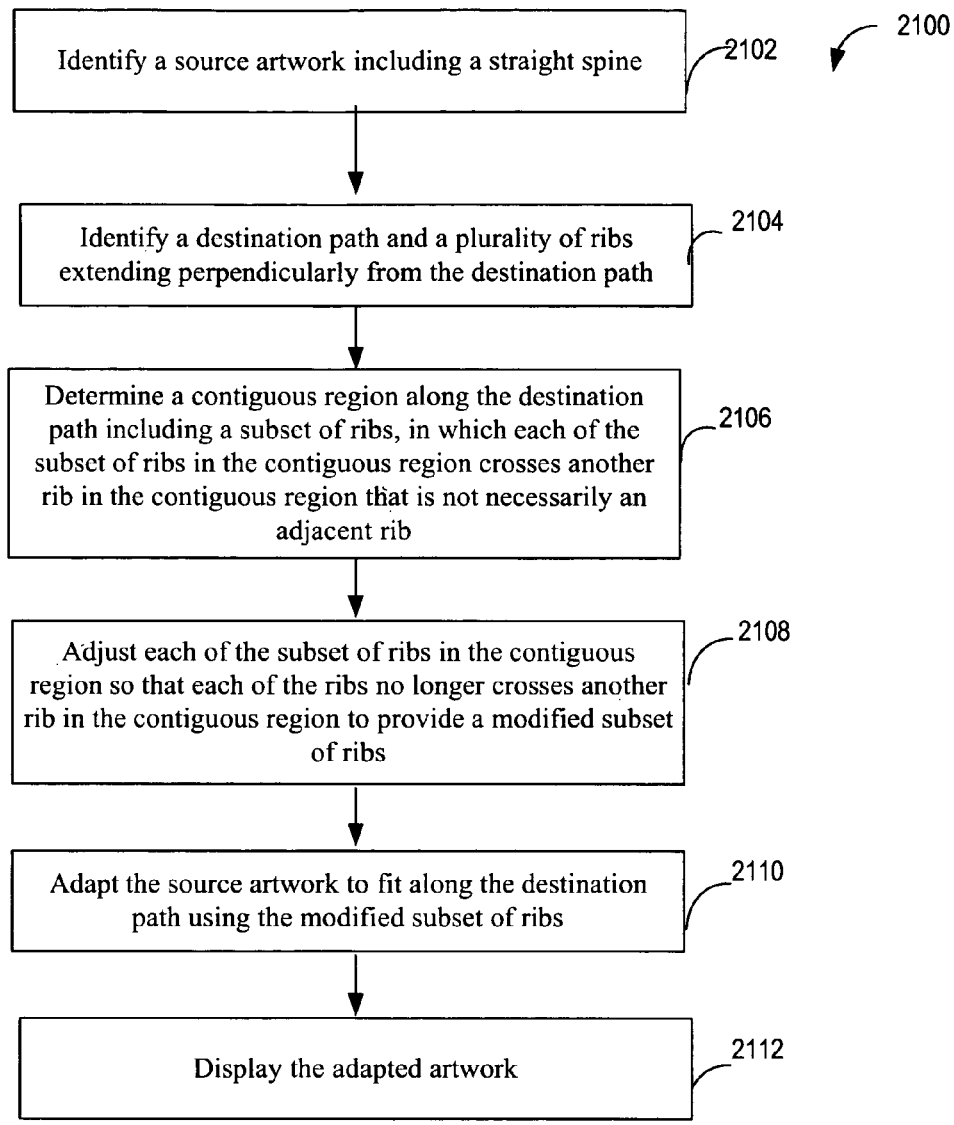
FIG. 21 is a flow chart for folding avoidance in skeletal stroke application in accordance with some embodiments.

FIG. 21 is a flow chart 2100 for folding avoidance in skeletal stroke application in accordance with some embodiments. At stage 2102, identify a source artwork including a straight spine is performed (e.g., executed using a processor 102 of computer system 100, such as a programmed computer system). At stage 2104, identify a destination path and a plurality of ribs extending perpendicularly from the destination path is performed (e.g., executed using a processor 102 of computer system 100), in which the source artwork is mapped onto the destination path. In some embodiments, a destination path is based on user input (e.g., using a graphics application executed using a processor 102 of computer system 100, such as a programmed computer system). In some embodiments, the destination path is a destination spine. At stage 2106, determine a contiguous region along the destination path including a subset of ribs is performed, in which each of the subset of ribs in the contiguous region crosses another rib in the contiguous region that is not necessarily an adjacent rib (e.g., executed using a processor 102 of computer system 100). In some embodiments, the contiguous region is greater than a retrograde area and less than an entire length of the destination path. In some embodiments, the contiguous region includes a plurality of adjacent ribs. At stage 2108, adjust each of the subset of ribs in the contiguous region so that each of the ribs no longer crosses another rib in the contiguous region to provide a modified subset of ribs is performed (e.g., executed using a processor 102 of computer system 100). In some embodiments, a width of each of the plurality of ribs is equal to a maximum width of the source artwork. In some embodiments, a width of each of the modified subset of ribs is not equal to a width of each of the plurality of ribs in the source artwork. In some embodiments, a width of each of the modified subset of ribs are not equal to a width of each of the plurality of ribs in the source artwork, and a width of each of a plurality of ribs located outside of the contiguous region are equal to the width of each of the plurality of ribs in the source artwork. At stage 2110, adapt the source artwork to fit along the destination path using the modified subset of ribs is performed (e.g., executed using a processor 102 of computer system 100). At stage 2112, display the adapted artwork is performed (e.g., executed using a processor 102 of computer system 100).

Figure 22:
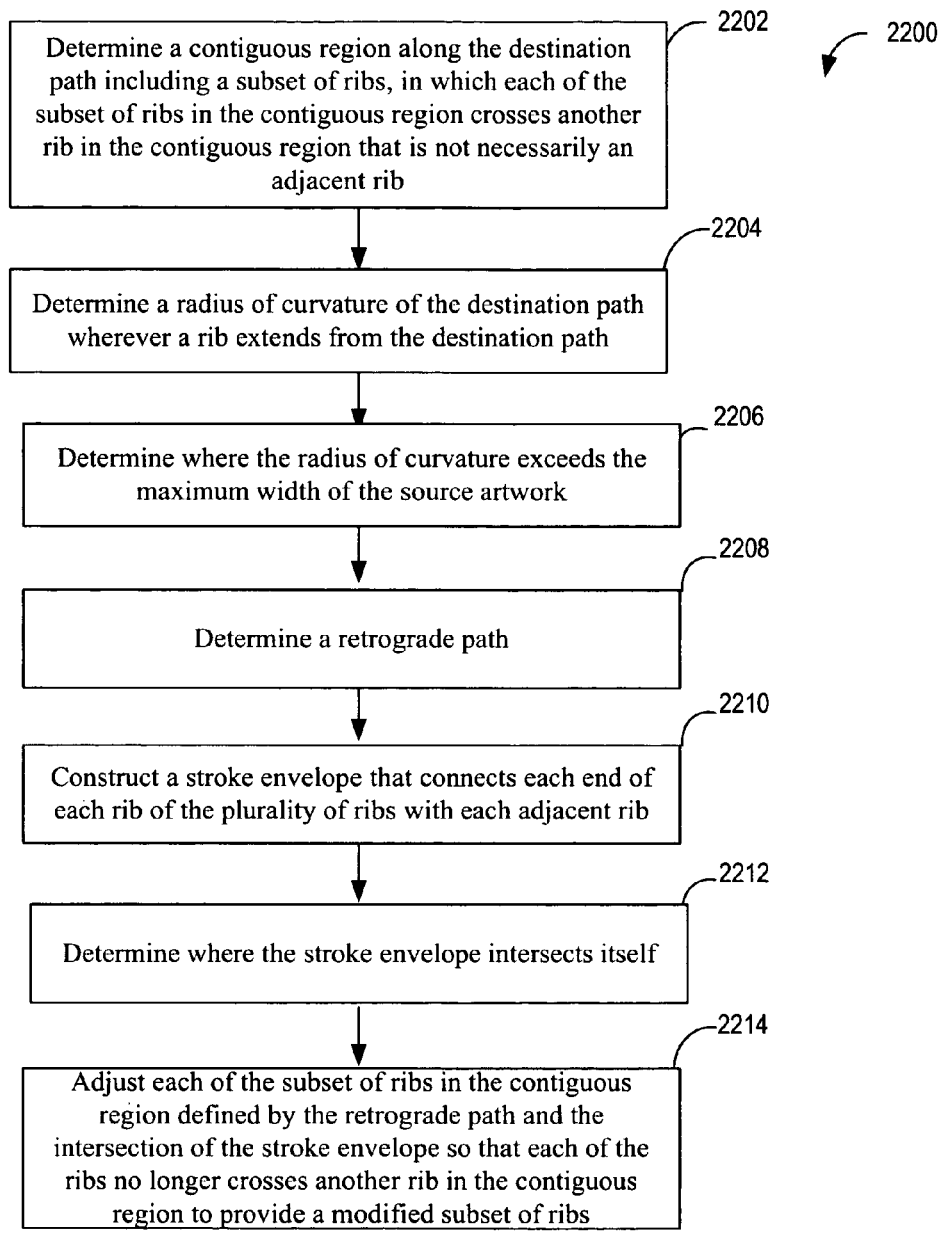
FIG. 22 is another flow chart for folding avoidance in skeletal stroke application in accordance with some embodiments.

FIG. 22 is another flow chart 2200 for folding avoidance in skeletal stroke application in accordance with some embodiments. At stage 2202, determine a contiguous region along the destination path including a subset of ribs is performed, in which each of the subset of ribs in the contiguous region crosses another rib in the contiguous region that is not necessarily an adjacent rib. At stage 2204, determine a radius of curvature of the destination path wherever a rib extends from the destination path is performed (e.g., executed using a processor 102 of computer system 100). At stage 2206, determine where the radius of curvature exceeds the maximum width of the source artwork is performed (e.g., executed using a processor 102 of computer system 100). At stage 2208, determine a retrograde path is performed (e.g., executed using a processor 102 of computer system 100). At stage 2210, construct a stroke envelope that connects each end of each rib of the plurality of ribs with each adjacent rib is performed (e.g., executed using a processor 102 of computer system 100). At stage 2212, determine where the stroke envelope intersects itself (e.g., an interior stroke envelope edge intersection point) is performed (e.g., executed using a processor 102 of computer system 100). In some embodiments, identify adjacent ribs that cross each other is performed to determine the problem area, and then identify each rib of the plurality of ribs that intersects with another rib of the plurality of ribs that is not necessarily an adjacent rib is performed to identify each of the ribs in the problem area that requires adjusting for folding avoidance in skeletal stroke application. At stage 2214, adjust each of the subset of ribs in the contiguous region defined by the retrograde path and the intersection of the stroke envelope so that each of the ribs no longer crosses another rib in the contiguous region to provide a modified subset of ribs is performed. In various embodiments, stages 2204-2212 are used to perform stage 2106 of FIG. 21 and/or stage 2108 is used to perform step 2108 of FIG. 21.

Figure 23:
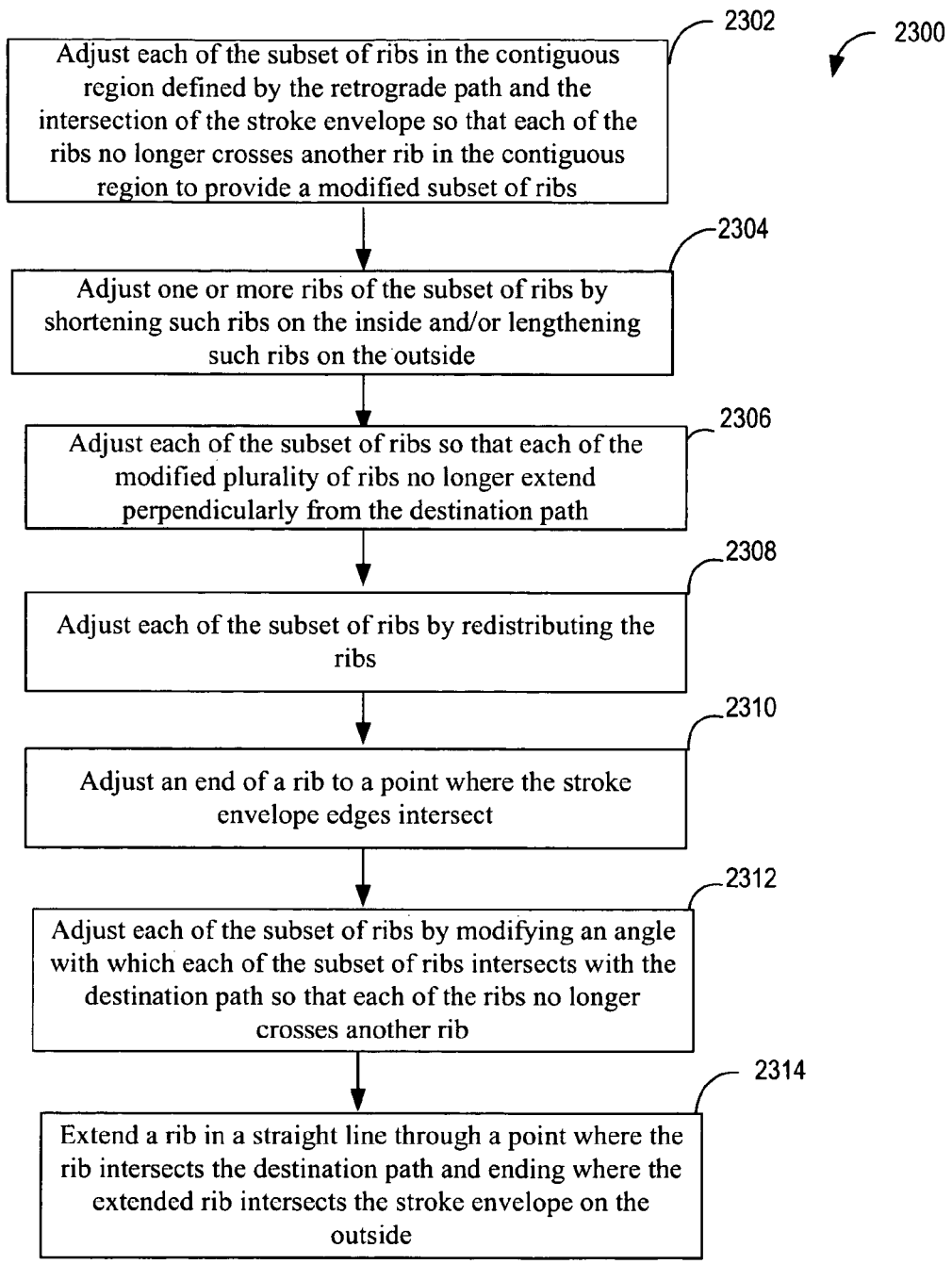
FIG. 23 is another flow chart for folding avoidance in skeletal stroke application in accordance with some embodiments.

FIG. 23 is another flow chart 2300 for folding avoidance in skeletal stroke application in accordance with some embodiments. At stage 2302, adjust each of the subset of ribs in the contiguous region defined by the retrograde path and the intersection of the stroke envelope so that each of the ribs no longer crosses another rib in the contiguous region to provide a modified subset of ribs is performed. At stage 2304, adjust one or more ribs of the subset of ribs by shortening such ribs on the inside and/or lengthening such ribs on the outside is performed (e.g., executed using a processor 102 of computer system 100). At stage 2306, adjust each of the subset of ribs so that each of the modified plurality of ribs no longer extend perpendicularly from the destination path is performed (e.g., executed using a processor 102 of computer system 100). At stage 2308, adjust each of the subset of ribs by redistributing the ribs is performed (e.g., executed using a processor 102 of computer system 100). At stage 2310, adjust an end of a rib to a point where the stroke envelope edges intersect is performed (e.g., executed using a processor 102 of computer system 100). At stage 2312, adjust each of the subset of ribs by modifying an angle with which each of the subset of ribs intersects with the destination path so that each of the ribs no longer crosses another rib is performed (e.g., executed using a processor 102 of computer system 100). At stage 2314, extend a rib in a straight line through a point where the rib intersects the destination path and ending where the extended rib intersects the stroke envelope on the outside is performed (e.g., executed using a processor 102 of computer system 100). In various embodiments, stages 2304-2314 are used to perform stage 2108 of FIG. 21 and/or stage 2214 of FIG. 22.

In some embodiments, these techniques are applied to a source artwork using a spine other than the centerline of the source artwork. For example, an edge (e.g., an outer side/edge) of the source artwork can be used as the spine by constructing a new source that is twice as wide as the original source artwork in which the original source artwork is entirely on one side of the center of the new source artwork. In this example, the centerline of this new source artwork would be one edge of the original source artwork. Those of ordinary skill in the art will appreciate that other spines, including curved spines, can be utilized for similarly applying the techniques disclosed herein.

In some embodiments, these techniques are applied using mapping mechanisms other than skeletal strokes. For example, when applying a selected spine with a set of ribs to a source artwork, the source artwork can also be viewed as a set of rectangles in which the ribs, the centerline or spine and the outer edge of the source artwork form the bounds/edges of such quadrilaterals. In this example, upon mapping these quadrilaterals onto the destination path with its ribs, it will be apparent that an equal number of the quadrilaterals are no longer rectangles. Thus, each source rectangle is mapped onto the corresponding destination quadrilateral. Those of ordinary skill in the art will appreciate that other mapping mechanisms can be utilized for similarly applying the techniques disclosed herein.

Although the foregoing embodiments have been described in some detail for purposes of clarity of understanding, the techniques are not limited to the details provided. There are many alternative ways of implementing the techniques. The disclosed embodiments are illustrative and not restrictive.

What is claimed is:

1. A system, comprising:
   a processor configured to:
      identify a destination path for a source artwork, a plurality of ribs intersected with the destination path, and a stroke envelope for the plurality of ribs, wherein each of the plurality of ribs comprises a respective line segment extending perpendicularly from the destination path, wherein the stroke envelope comprises one or more outer paths connecting each of the endpoints of the ribs, wherein the source artwork is mapped onto the destination path;
      determine a contiguous region along the destination path including a subset of ribs of the plurality of ribs, wherein mapping the source artwork onto the destination path causes each of the subset of ribs in the contiguous region to cross at least one other rib in the contiguous region; and
      adjust each of the subset of ribs in the contiguous region to remove all crossings of ribs in the contiguous region to provide a modified subset of ribs, wherein adjusting each of the subset of ribs comprises, for each of the subset of ribs in the contiguous region:
         moving at least one endpoint of the respective rib an intersection point of an interior edge of the stroke envelope, wherein the intersection point is a point where at least one edge of the stroke envelope intersects itself; and
   a memory coupled to the processor and configured to provide the processor with instructions.

2. The system recited in claim 1, wherein the contiguous region is greater than a retrograde area and less than an entire length of the destination path.

3. The system recited in claim 1, wherein the contiguous region includes a plurality of adjacent ribs.

4. The system recited in claim 1, wherein the destination path includes one or more segments, wherein each segment is curved or straight.

5. The system recited in claim 1, wherein the destination path is based on a user input.

6. The system recited in claim 1, wherein a width of each of the plurality of ribs is equal to a maximum width of the source artwork.

7. The system recited in claim 1, wherein a width of each of the modified subset of ribs is not equal to a width of each of the plurality of ribs in the source artwork.

8. The system recited in claim 1, wherein a width of each of the modified subset of ribs is not equal to a width of each of the plurality of ribs in the source artwork, and a width of each of an additional subset of ribs located outside of the contiguous region is equal to the width of each of the plurality of ribs in the source artwork.

9. The system recited in claim 1, wherein the processor is further configured to:
   adapt the source artwork to fit along the destination path using the modified subset of ribs.

10. The system recited in claim 1, wherein the processor is configured to determine, including by:
   identifying each rib of the plurality of ribs that intersects with at least one other rib of the plurality of ribs.

11. The system recited in claim 1, wherein the processor is configured to determine, including by:
   constructing the stroke envelope that connects each end of each rib of the plurality of ribs with each adjacent rib.

12. The system recited in claim 1, wherein the processor is configured to determine, including by:
   constructing the stroke envelope that connects each end of each rib of the plurality of ribs with each adjacent rib; and
   determining the intersection point.

13. The system recited in claim 1, wherein the processor is configured to determine, including by:
   identifying adjacent ribs that cross each other.

14. The system recited in claim 1, wherein the processor is configured to determine, including by:
   determining a radius of curvature of the destination path wherever a rib extends from the destination path;
   determining where the radius of curvature exceeds the maximum width of the source artwork; and
   determining a retrograde path.

15. The system recited in claim 1, wherein the processor is further configured to adjust each of the subset of ribs in the contiguous region by:
   shortening each of the ribs on the inside.

16. The system recited in claim 1, wherein the processor further configured to adjust each of the subset of ribs in the contiguous region by performing one or more of the following:
   shortening at least one rib on the inside or lengthening the at least one rib on the outside.

17. The system recited in claim 1, wherein the processor is further configured to adjust each of the subset of ribs in the contiguous region by:
   redistributing each of the subset of ribs.

18. The system recited in claim 1, wherein the processor is further configured to adjust each of the subset of ribs in the contiguous region by:
   extending at least one rib in a straight line through a point where the rib intersects the destination path and ending where the extended rib intersects the stroke envelope on the outside.

19. A method, comprising:
   identifying, by a processor, a destination path for a source artwork, a plurality of ribs intersected with the destination path, and a stroke envelope for the plurality of ribs, wherein each of the plurality of ribs comprises a respective line segment extending perpendicularly from the destination path, wherein the stroke envelope comprises one or more outer paths connecting each of the endpoints of the ribs, wherein the source artwork is mapped onto the destination path;
   determining, by a processor, a contiguous region along the destination path including a subset of ribs of the plurality of ribs, wherein mapping the source artwork onto the destination path causes each of the subset of ribs in the contiguous region to cross at least one other rib in the contiguous region, and the contiguous region is greater than a retrograde area and less than an entire length of the destination path; and
   adjusting, by a processor, each of the subset of ribs in the contiguous region to remove all crossings of ribs in the contiguous region to provide a modified subset of ribs, wherein adjusting each of the subset of ribs comprises, for each of the subset of ribs in the contiguous region:
      moving at least one endpoint of the respective rib to an intersection point of an interior edge of the stroke envelope,
      wherein the intersection point is a point where at least one edge of the stroke envelope intersects itself.

20. The method recited in claim 19, wherein determining the contiguous region includes:
   determining a radius of curvature of the destination path wherever a rib extends from the destination path;
   determining where the radius of curvature exceeds the maximum width of the source artwork; and
   determining a retrograde path.

21. The method recited in claim 19, wherein adjusting each of the subset of ribs in the contiguous region further includes performing one or more of the following:
   shortening at least one rib on the inside or lengthening at least one rib on the outside.

22. The method recited in claim 19, wherein adjusting each of the subset of ribs in the contiguous region further includes:
   redistributing each of the subset of ribs.

23. A computer program product, the computer program product being embodied in a non-transitory computer readable storage medium and comprising computer instructions for:
   identifying a destination path for a source artwork, a plurality of ribs intersected with the destination path, and a stroke envelope for the plurality of ribs, wherein each of the plurality of ribs comprises a respective line segment extending perpendicularly from the destination path, wherein the stroke envelope comprises one or more outer paths connecting each of the endpoints of the ribs, wherein the source artwork is mapped onto the destination path;
   determining a contiguous region along the destination path including a subset of ribs of the plurality of ribs, wherein mapping the source artwork onto the destination path causes each of the subset of ribs in the contiguous region to cross at least one other rib in the contiguous region, and the contiguous region is greater than a retrograde area and less than an entire length of the destination path; and
   adjusting each of the subset of ribs in the contiguous region to remove all crossings of ribs in the contiguous region to provide a modified subset of ribs, wherein adjusting each of the subset of ribs comprises, for each of the subset of ribs in the contiguous region:
      moving at least one endpoint of the respective rib to an intersection point of an interior edge of the stroke envelope, wherein the intersection point is a point where at least one edge of the stroke envelope intersects itself.

24. The computer program product recited in claim 23, wherein the computer instructions for adjusting each of the subset of ribs in the contiguous region further include computer instructions for performing one or more of the following:
   shortening at least one rib on the inside or lengthening at least one rib on the outside.

25. The computer program product recited in claim 23, wherein the computer instructions for adjusting each of the subset of ribs in the contiguous region further include computer instructions for:
   redistributing each of the subset of ribs.

\* \* \* \* \*